US006891287B2

(12) United States Patent
Moret

(10) Patent No.: US 6,891,287 B2
(45) Date of Patent: May 10, 2005

(54) ALTERNATING CURRENT AXIALLY OSCILLATING MOTOR

(75) Inventor: Michel-Antoine C. Moret, Geneva (CH)

(73) Assignee: Les Produits Associes LPA, S.A., Geneva (CH)

(*) Notice: Subject to any disclaimer, the term of this patent is extended or adjusted under 35 U.S.C. 154(b) by 0 days.

(21) Appl. No.: 10/620,435

(22) Filed: Jul. 17, 2003

(65) Prior Publication Data

US 2005/0012406 A1 Jan. 20, 2005

(51) Int. Cl.$^7$ ............................................. H02K 33/12
(52) U.S. Cl. ............... 310/36; 310/156.01; 310/156.25; 318/134
(58) Field of Search ............... 310/156.01, 36; 318/134, 119; 601/46, 53, 54, 89, 93; 335/250, 252

(56) References Cited

U.S. PATENT DOCUMENTS

| 3,119,135 | A | | 1/1964 | Frésard | 15/22 |
|---|---|---|---|---|---|
| 3,475,629 | A | * | 10/1969 | Lagier | 310/36 |
| 4,001,659 | A | * | 1/1977 | Shipman | 318/119 |
| 4,090,112 | A | * | 5/1978 | Selverstone | 318/128 |
| 4,276,499 | A | * | 6/1981 | Masuda et al. | 318/119 |
| 4,287,457 | A | * | 9/1981 | Takemura | 318/133 |
| 4,595,849 | A | | 6/1986 | Cuénoud | 310/36 |
| 4,999,531 | A | * | 3/1991 | Mavadia et al. | 310/23 |
| 5,045,735 | A | * | 9/1991 | Christiaens | 310/38 |
| 5,225,770 | A | * | 7/1993 | Montagu | 324/146 |
| 5,514,224 | A | * | 5/1996 | Panchanathan | 148/104 |
| 5,753,985 | A | * | 5/1998 | Redlich | 310/36 |
| 5,934,908 | A | | 8/1999 | Woog et al. | 433/216 |
| 6,809,451 | B1 | * | 10/2004 | Brown | 310/156.08 |

* cited by examiner

*Primary Examiner*—Burton Mullins
(74) *Attorney, Agent, or Firm*—Finnegan, Henderson, Farabow, Garrett & Dunner, LLP

(57) ABSTRACT

An alternating current motor may include a rotor configured to rotate about a longitudinal axis, the rotor comprising a diametrically magnetized permanent magnet. Furthermore, the alternating current motor may include stationary coils having a magnetic axis substantially perpendicular to the rotor's longitudinal axis, the stationary coils adapted to the rotor's outer periphery and being substantially coaxial with the rotor's longitudinal axis. In addition, the alternating current motor may include a stator adapted to the stationary coils' outer periphery and being substantially coaxial with the rotor's longitudinal axis, wherein the diametrically magnetized permanent magnet is configured to cause the rotor's oscillation angle to vary no more than 30% between the rotor's oscillation angle at a beginning value of a frequency range of an alternating current in the stationary coil and the rotor's oscillation angle at an ending value of the frequency range of the alternating current in the stationary coil.

30 Claims, 8 Drawing Sheets

-Prior Art-

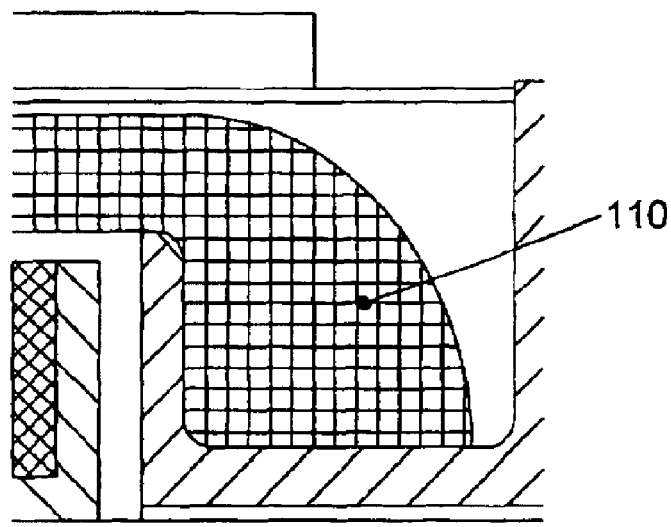
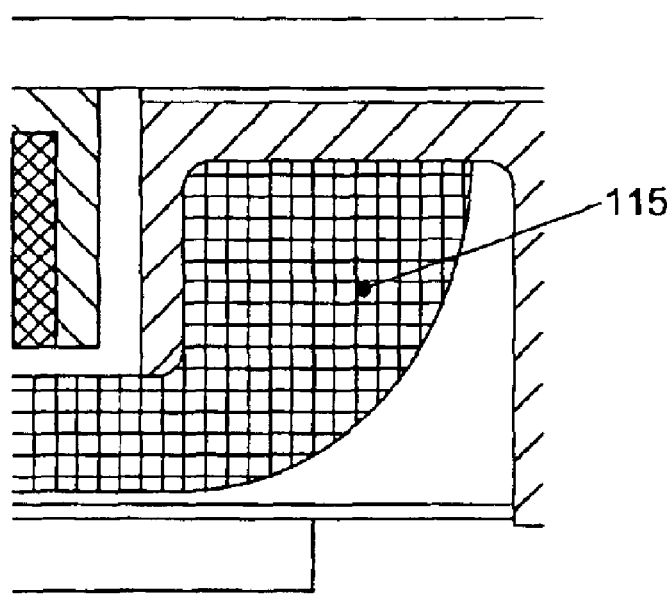
Fig. 5

Fig. 7 -Prior Art-

ALTERNATING CURRENT AXIALLY OSCILLATING MOTOR

TECHNICAL FIELD

The present invention relates to the field of alternating current (AC) motors. More particularly, the present invention, in various specific embodiments, involves AC motors having an axially oscillating drive motion.

BACKGROUND INFORMATION

Small AC oscillating motors may be used in handheld body care devices. Particularly, these motors may be used in body care devices ranging from beauty care devices that treat wrinkles by gently massaging the face to devices sexually stimulate persons experiencing sexual dysfunction.

Conventional AC oscillating motors are typically powered through main AC electrical services in order to draw sufficient electrical power. To increase the mechanical power output, conventional AC motors may use asymmetrical magnetic reluctance between the stator and the rotor. With asymmetrical magnetic reluctance, however, the rotor may rotate to an undesired position and may become magnetically locked at the undesired position when the power to it is turned off. To compensate for this undesirable rotor locking, conventional AC motors use a recall spring. The recall spring forces the rotor to a neutral position (or unlocked position) when the power is turned off.

To optimize the power consumed by conventional AC motors using asymmetrical magnetic reluctance and a recall spring, the motors must be tuned. A conventional motor may be optimally tuned when its natural resonance frequency is adjusted to be approximately equal to the frequency of the AC power source feeding the motor. Factors contributing to the natural resonance frequency include the recall spring's inertial constant and the rotor's moment of inertia. A conventional motor may be tuned, for example, by adjusting the rotor's moment of inertia by adding a specifically weighted flywheel to the rotor's shaft. The flywheel should be sufficiently weighted to give the conventional motor a natural resonance frequency approximately equal to the frequency of the motor's AC power source.

Because optimal turning is a function of the rotor's inertia, it logically follows than an instrument fixed on the rotor's shaft contributes to the rotor's inertia and thus to the motor's efficiency. In other words, the conventional motor can be tuned to its optimal point for only one power source frequency, one spring constant, one flywheel weight, and one instrument weight. Because it is not practical to change the spring and flywheel, the conventional motor can only give optimal performance with only one instrument mass driven by the rotor's shaft. Moreover, conventional motors are optimally tuned to only one power source frequency. Therefore, a conventional motor tuned for a 50 Hz power source, for example, would no longer be optimally tuned when powered by a 60 Hz source.

This turning problem may not be a major concern for devices using the same type of instrument, such as, for example, electric toothbrushes having stem-brushes of the same shape, weight, and dimensions. However, this problem may become a concern when several types of instruments may be used, with each having a different shape, weight, and rotational inertia. With a different type mass attached to the rotor's shaft, the motor's tuning is thus no longer optimal. This may be particularly true for body massaging devices, such as sexual stimulation devices that use a variety of differently shaped and weighted instruments.

Furthermore, the tuning problem occurs when a device is tuned for one power source frequency and is subsequently operated at another power source frequency. For example, an electric tooth brush optimally tuned for a 50 Hz power system would no longer be optimally tuned if operated on a 60 Hz system, even if the same instrument is placed on the tooth brush's shaft on both power systems.

The aforementioned tuning problem becomes worse when the instrument using the conventional motor has an applied load (e.g., when it is pressed against a body part). In this case, the mechanical frequency of the rotor system increases and is no longer tuned properly. When this happens, the mechanical power at the rotor's shaft decreases rapidly to a very small value because the natural resonance frequency becomes higher than the power source frequency.

SUMMARY OF THE INVENTION

Consistent with the present invention, an alternating current axially oscillating motor is provided that avoids problems associated with prior alternating current axially oscillating motors as discussed herein above.

In one aspect, an alternating current motor comprises a rotor configured to rotate about a longitudinal axis, the rotor comprising a diametrically magnetized permanent magnet, stationary coils having a magnetic axis substantially perpendicular to the rotor's longitudinal axis, the stationary coils adapted to the rotor's outer periphery and being substantially coaxial with the rotor's longitudinal axis, a stator adapted to the stationary coils' outer periphery and being substantially coaxial with the rotor's longitudinal axis, and wherein the diametrically magnetized permanent magnet is configured to cause the rotor's oscillation angle to vary no more than 30% between the rotor's oscillation angle at a beginning value of a frequency range of an alternating current in the stationary coils and the rotor's oscillation angle at an ending value of the frequency range of the alternating current in the stationary coil.

In another aspect, an alternating current oscillating motor comprises a rotor configured to rotate about a longitudinal axis, the rotor comprising a diametrically magnetized permanent magnet having at least one of a remanence of at least 10 KG, a coercive force of at least 10 KOe, an intrinsic coercive force of at least 12 KOe, and a maximum energy product of at least 30 MGOe, stationary coils having a magnetic axis substantially perpendicular to the rotor's longitudinal axis, the stationary coils adapted to the rotor's outer periphery and being substantially coaxial with the rotor's longitudinal axis, and a stator adapted to the stationary coils' outer periphery and being substantially coaxial with the rotor's longitudinal axis, the stator having a substantially constant permeability for all rotor angular positions about the longitudinal axis.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 5 illustrates a cross-sectional view of an AC oscillating motor consistent with an exemplary embodiment of the present invention;

DETAILED DESCRIPTION

Figure 1:
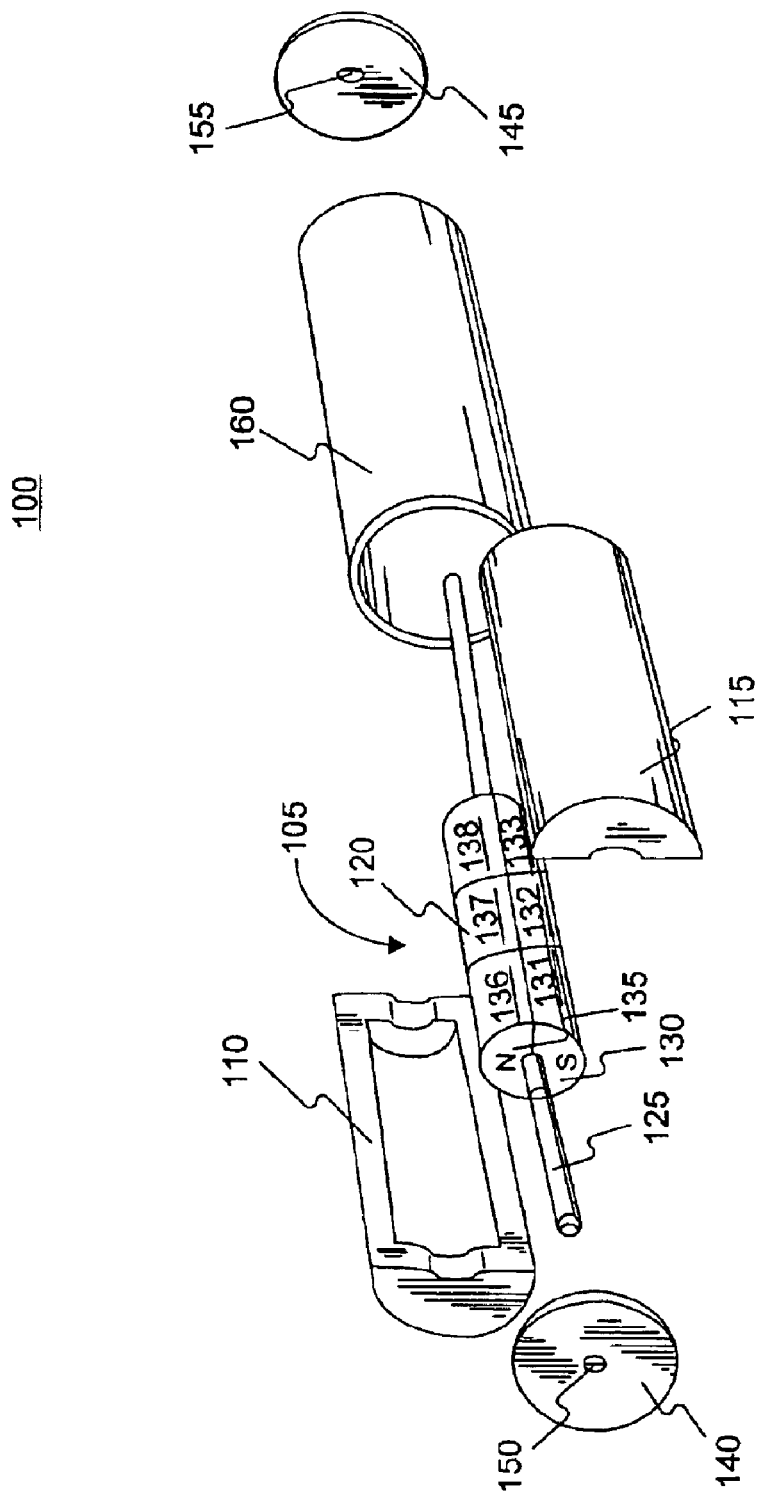
FIG. 1 is a functional block diagram of an AC oscillating motor consistent with an exemplary embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Embodiments of the present invention provide an alternating current (AC) oscillating motor that, as compared with conventional motors, have an increased efficiency by producing the same torque at a reduced power consumption, a higher torque at approximately the same power consumption, or a combination of both. This increased efficiency may be achieved at least by employing, for example, powerful magnets in the rotor, eliminating asymmetrical magnetic reluctance, or a combination of both. The increased efficiency may also allow embodiments of the invention to operate at lower voltages, for example, at 20 V. Lower voltages can be advantageous for electric toothbrushes or massage appliances for safety reasons because such appliances may then be fed from an AC electrical service through a step-down transformer, and thus may not require insulation levels corresponding to the electrical service's higher voltage.

Furthermore, embodiments of the present invention may be constructed in a compact and simple way and may typically have an axial length of about 55 mm and a diameter of about 25 mm. The power consumption at 50 Hz or at 60 Hz may typically lie between 1.3 W and 3.5 W. The aforementioned dimensions and ratings are exemplary and other dimensions and ratings may be used.

Consistent with the general principles of the present invention, an AC motor comprises a rotor, two coils, and a stator. The rotor may be configured to rotate about a longitudinal axis and may comprise a diametrically magnetized permanent magnet. The coils may be stationary having a magnetic axis substantially perpendicular to the rotor's longitudinal axis. The stationary coils may also be adapted to the rotor's outer periphery and be substantially coaxial with the rotor's longitudinal axis. The stator may be adapted to the stationary coils' outer periphery and be substantially coaxial with the rotor's longitudinal axis. The rotor's diametrically magnetized permanent magnet may be configured to cause the rotor's oscillation angle to vary no more than 30% over a frequency range of an alternating current in the stationary coil. Furthermore, the diametrically magnetized permanent magnet may be configured to cause the AC motor to have a mechanical power output of about five times greater than a conventional motor of substantially the same physical size and using asymmetrical magnetic reluctance. Also, the diametrically magnetized permanent magnet may have at least one of a remanence of at least 10 KG, a coercive force of at least 10 KOe, an intrinsic coercive force of at least 12 KOe, and a maximum energy product of at least 30 MGOe. Moreover, the stator may have a substantially constant permeability for all rotor angular positions about the longitudinal axis.

AC motors consistent with embodiment of the present invention may be disposed within a variety of different devices including a small handheld appliance, a beauty care device, a sexual simulation device, an oral hygiene device, a body massaging device, a shoes polishing device, a jewelry care device, a hair trimming device, or a hair shaving device. The aforementioned devices are exemplary and AC motors consistent with the present invention may be disposed within other devices.

As herein embodied and illustrated in FIG. 1, an AC motor consistent with an embodiment of the present invention may comprise an AC motor 100. While elements of AC motor 100 will be described in greater detail below, AC motor 100 generally comprises a rotor 105, stationary coils comprising a first stationary coil piece 110 and a second stationary coil piece 115, and a stator 160. The aforementioned elements are exemplary and elements other than those shown may comprise an AC motor consistent with embodiments of the present invention.

As shown in FIG. 1, rotor 105 may comprise a diametrically magnetized permanent magnet 120 and a rotor shaft 125. Rotor 105 may be configured to rotate about a longitudinal axis running through rotor shaft 125. Diametrically magnetized permanent magnet 120 may comprise a rare earth material, such as NdFeB, Neodymium, or Samarium Cobalt (SaCo). These materials are exemplary and diametrically magnetized permanent magnet 120 may comprise other materials.

Furthermore, diametrically magnetized permanent magnet 120 may comprise one piece or may comprise a first magnet piece 130 and a second magnet piece 135. One of first magnet piece 130 and second magnet piece 135 may comprise a magnetic north pole and the other may comprise a magnetic south pole. First magnet piece 130 and second magnet piece 135 may be substantial equal by volume, weight, or both. In addition, first magnet piece 130 and second magnet piece 135 may comprise one piece each or may comprise a plurality of segments. For example, first magnet piece 130 may include segments 131, 132, and 133, each comprising a magnetic north pole, while second magnet piece 135 may comprise segments 136, 137 and 138, each comprising a magnetic south pole. Embodiments of the invention are not limited to any number of segments.

Moreover, individual segments of opposite polar orientation of first magnet piece 130 and second magnet piece 135 my be constructed in one piece to create diametrically magnetized segments that may be placed symmetrical about the longitudinal axis. For example, segments 131 and 136 may be formed in one piece to comprise a first diametrically magnetized segment. Likewise, segments 132 and 137 may comprise a second diametrically magnetized segment and segments 133 and 138 may comprise a third diametrically magnetized segment. Embodiments of the invention may include one or more diametrically magnetized segments. For example, one embodiment may include the second diametrically magnetized segment alone. However, if a more powerful motor is needed, for example, another embodiment may include, in addition to the second diametrically magnetized segment, the first diametrically magnetized segment, or the first diametrically magnetized segment and the third diametrically magnetized segment. In this manner, the size of diametrically magnetized permanent magnet 120 may be easily tailored to the cost, power, or weight needs of motor 100 by varying the number of diametrically magnetized segments comprising magnetized permanent magnet 120.

AC motor 100 may also include flanges 140 and 145 at the ends that include bearing openings 150 and 155 for rotor shaft 125 to pass. Flanges 140 and may be circular and may be adapted to end openings in stator 160.

The stationary coils, which may comprise first stationary coil piece 110 and second stationary coil piece 115, may have a magnetic axis substantially perpendicular to the longitudinal axis running through rotor shaft 125. In addition, the stationary coils may be adapted to the outer periphery of rotor 105 and may be substantially coaxial with the longitudinal axis running through rotor shaft 125. Although not shown in FIG. 1, a supply voltage is applied to coils 110 and 115 to energize them by creating an alternating current passing through each coil. Coils 110 and 115 may be connected in parallel (for a higher power output for a given supply voltage) or in series (for a lower power output for the given supply voltage).

Stator 160 may be adapted to the outer periphery of the stationary coils and may be substantially coaxial with the longitudinal axis running through rotor shaft 125. Furthermore, stator 160 may have a substantially constant permeability for all angular positions of rotor shaft 125 about the longitudinal axis running through rotor shaft 125. In addition, stator 160 may be substantially cylindrical and may comprise soft iron, for example. Stator 160 may be constructed of one piece, or may be constructed of two or more pieces that at least may facilitate assembly of alternating current motor 100.

Figure 2:
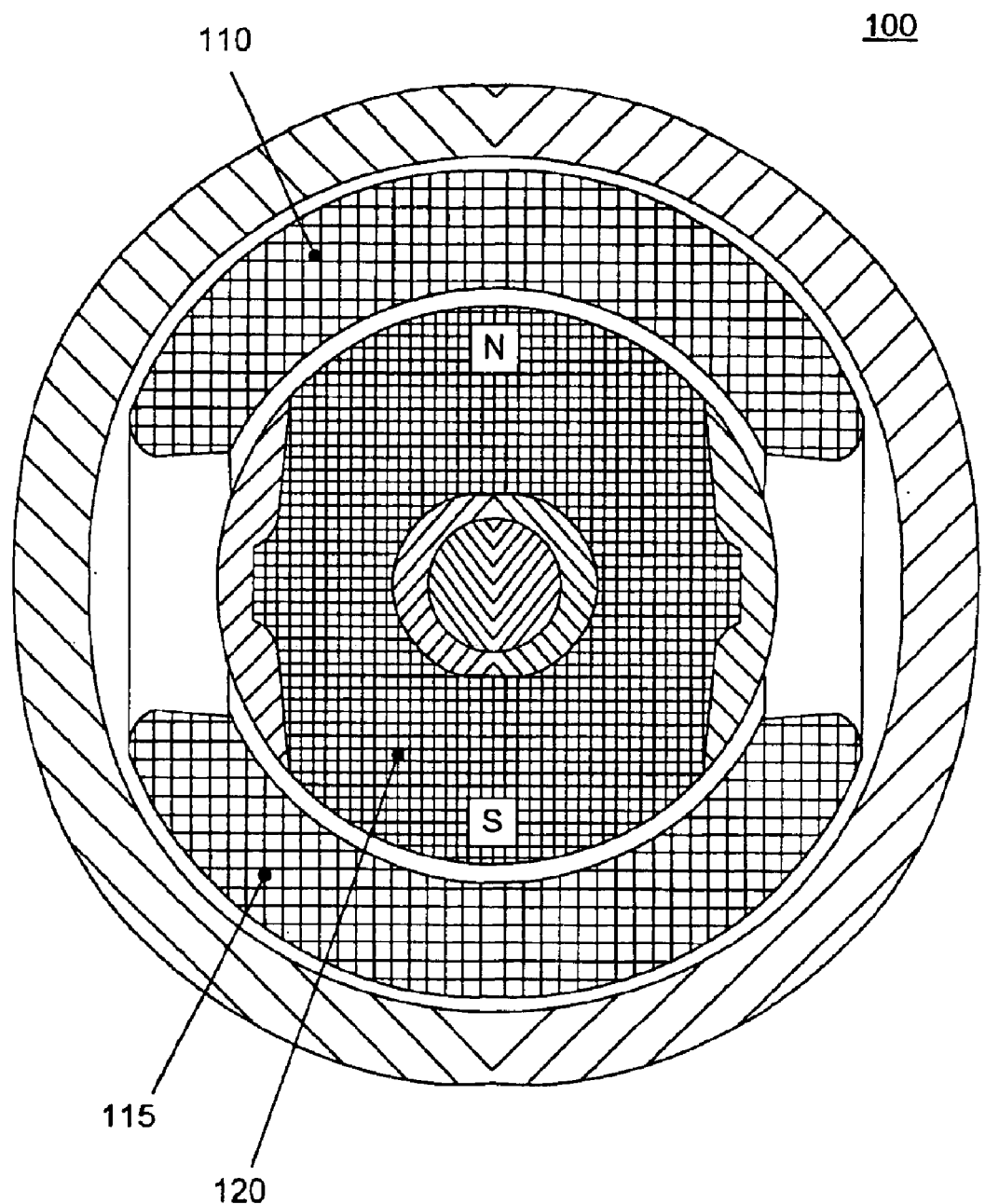
FIG. 2 illustrates a cross-sectional view of an AC oscillating motor consistent with an exemplary embodiment of the present invention.
Figure 3:
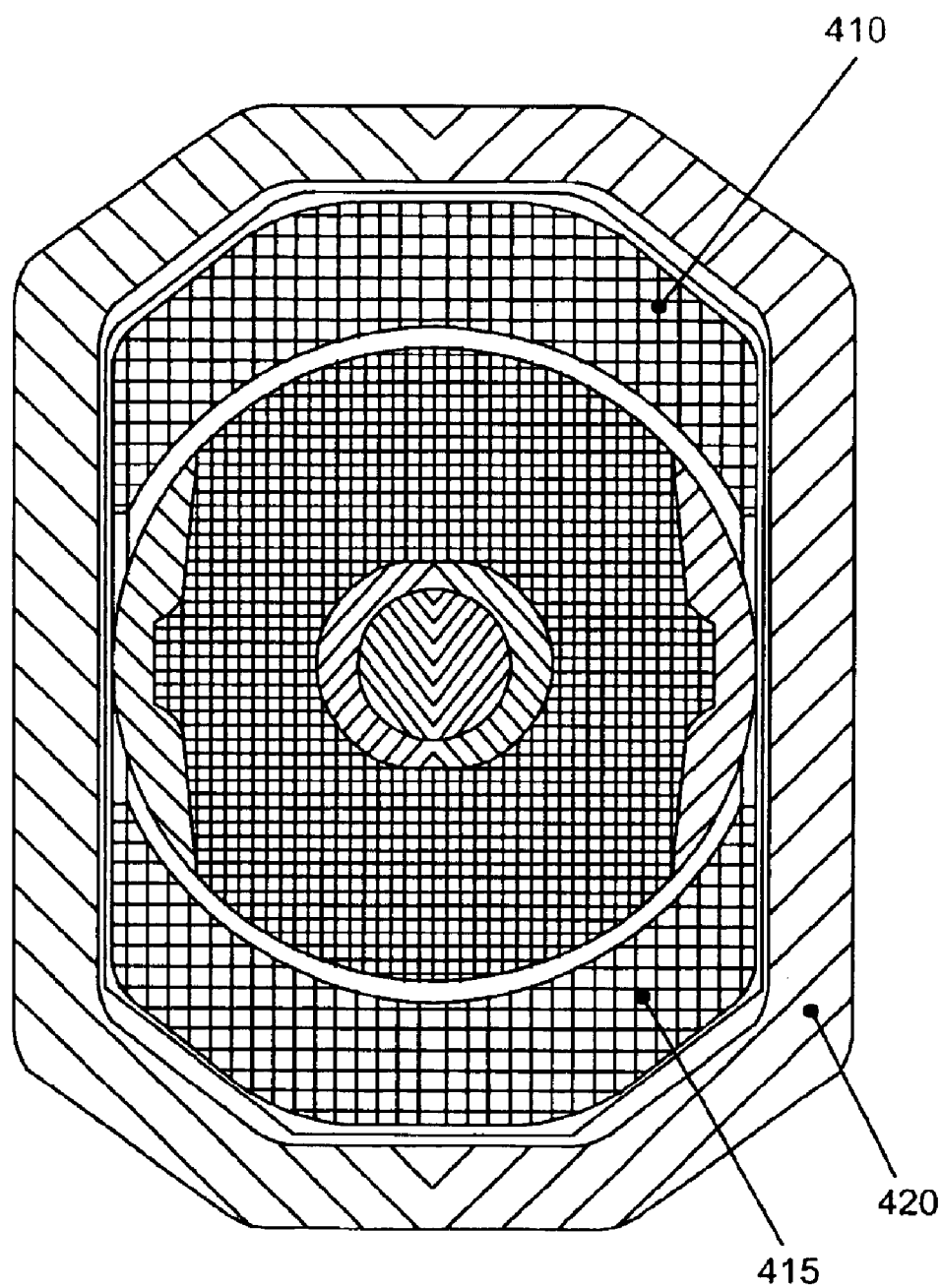
FIG. 3 illustrates a cross-sectional view of a conventional AC oscillating motor.

FIG. 2 shows a cross-section perpendicular to the longitudinal axis running through rotor shaft 125 of AC motor 100 shown in FIG. 1. FIG. 3 shows a cross-section of a conventional motor utilizing asymmetrical magnetic reluctance. Comparing first stationary coil piece 110 of FIG. 2 with coil 410 of FIG. 3, first stationary coil piece 110 may be about 60% larger than coil 410. In order to keep the input voltage of the energizing coils of AC motor 100 (FIG. 2) the same as that of a conventional motor utilizing asymmetrical magnetic reluctance (FIG. 3) and to keep the same temperature rise ($\Delta\Theta = RI^2$) in both motors, the stationary coils of AC motor 100 may be adapted. Adapting the stationary coil of AC motor 100 may include adjusting the wire diameter used in the stationary coil, the number of turns of the stationary coil, or a combination of both.

Figure 4B:
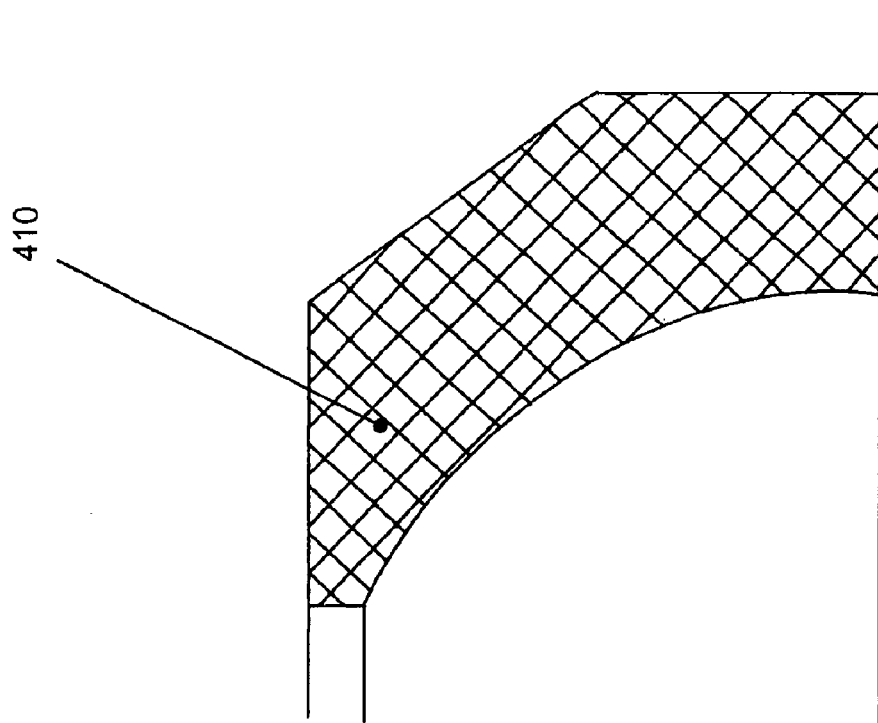
FIG. 4B illustrates a cross-sectional view of a coil of a conventional motor.
Figure 4A:
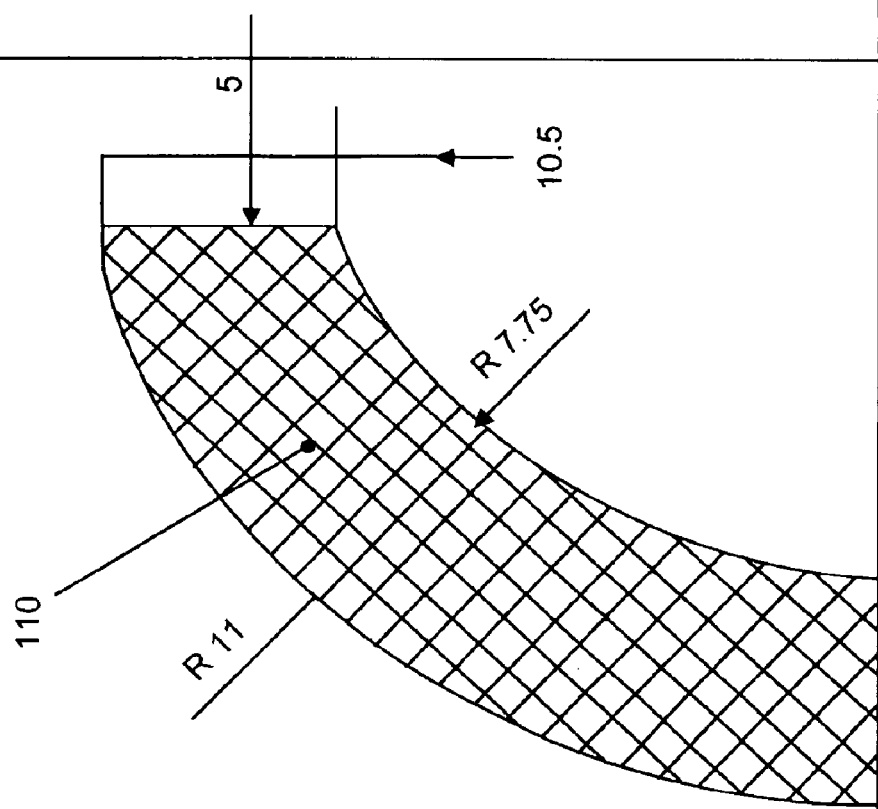
FIG. 4A illustrates a cross-sectional view of a stationary coil consistent with an exemplary embodiment of the present invention.
Figure 6:
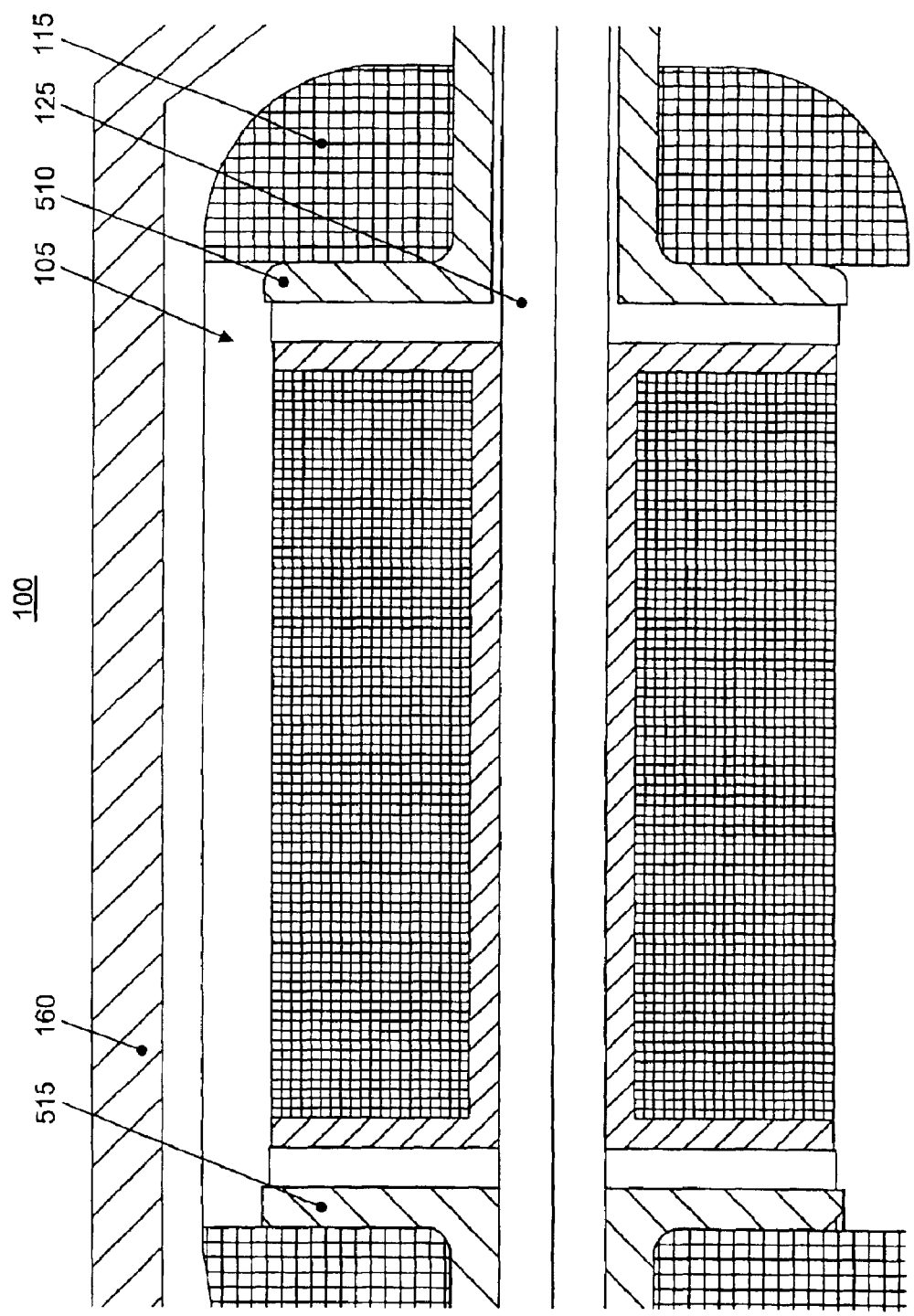
FIG. 6 illustrates a cross-sectional view of an AC oscillating motor consistent with an exemplary embodiment of the present invention.

Generally, the coils may be optimized by configuring the stationary coil, comprising first stationary coil piece 110 and second stationary coil piece 115, for example, to fill substantially all the space between stator 160 and rotor 105. When the stationary coil of AC motor 100 is optimized, it may increase the magnetic field produced in AC motor 100 by about 37% over conventional motors. An example of adaptation and optimization is illustrated by FIG. 4A and FIG. 4B. Coil 410 of the conventional motor, which utilizes asymmetrical magnetic reluctance, may have a cross-section of 24.98 mm$^2$, comprise 415 turns, have a resistance of 23 Ohms, and a copper wire diameter of 0.2 mm, as shown in FIG. 4B. As shown in FIG. 4A, first stationary coil piece 110 of AC motor 100 may have a cross-section of 39.87 mm$^2$, comprise 400 turns, have a resistance of 11.2 ohms, and a copper wire diameter of 0.28 mm, while keeping the same voltage at the input of the energizing coils and having the same temperature rise ($\Delta\Theta = RI^2$) as conventional motors. FIG. 5 further illustrates the assembled AC motor 100 shown in FIG. 1 by showing a cross-section of assembled AC motor 100 running through rotor shaft 125. FIG. 6 shows a longitudinal view of AC motor 100 showing rotor 105 with its rotor shaft 125, bearings 510 and 515 holding first stationary coil piece 115.

Embodiments of the present invention may use powerful magnets in the rotor to create an AC oscillating motor that may have low energy consumption, high mechanical power output, and a nearly negligible natural resonance frequency. Specifically, diametrically magnetized permanent magnet 120 may be bipolar and constructed of, for example, a rare earth type material, such as NdFeB, Neodymium, or SaCo. In order to at least substantially reduce the effect of the rotor's natural resonance frequency and to increase the mechanical power output, the following minimum values of the diametrically magnetized permanent magnet energy may, for example, be:

i) Minimum Remanence (Br): value of 10 KG or 1T;

ii) Minimum Coercive force (bHc): value of 10 KOe or 850 KA/m;

iii) Minimum Intrinsic coercive force (iHc): value of 12 KOe or 960 KA/m; and iv) Minimum Maximum energy product (BH max): value of 30 MGOe or 240 KJ/m.

For example, diametrically magnetized permanent magnet 120 may comprise a NdFeB type N42 magnet with a maximum energy product (BH) of 42 MGOe (or 374 KJ/m). N42 is an international code name with "N" standing for Neodynium and "42" corresponding to the maximum energy product (BH max) of the magnet, for example, 42 MGOe. Embodiments of the present invention may increase the mechanical power output by 2.5 to 5 times, or more, over conventional motors, yet have substantially the same size and power consumption of the conventional motors.

As discussed above, conventional AC oscillating motors may use asymmetrical magnetic reluctance. In order to keep conventional motors from magnetically locking, a recall spring is employed to return the armature to a neutral position when current to the coils is turned off. Increasing the power of magnets in conventional motors, however, only increases the magnetic locking problem. This is because increasing the power of the conventional motor's magnets would at least cause a corresponding need to increase the strength of the recall spring. As a result, the recall spring strength may need to be so large that the conventional motor would not function acceptably.

Moreover, using a constant permeability stator may provide an AC oscillating motor having no magnetic locking problems, even with a powerful high-energy magnet, because the permeability of the stator remains constant whatever the rotor's angular position. For example, if the stator comprises a substantially round soft iron tube and is substantially coaxial with the rotor, the permeability or permeance between the stator and the rotor remains constant. With constant permeability, asymmetrical magnetic reluctance is essentially eliminated, thus eliminating any magnetic locking problem. Furthermore, using a constant permeability stator in embodiments of the present invention may provide an AC oscillating motor having no magnetic locking problems. However, to have the magnetic poles of the magnet perpendicular to the stator field, it may be necessary to include a small recall spring or other positioning feature so that the rotor can oscillate properly. With no recall spring and no current in the energizing coils, the rotor can be positioned at any angular position and remains neutral over a rotation from 0° to 360°.

Figure 7:
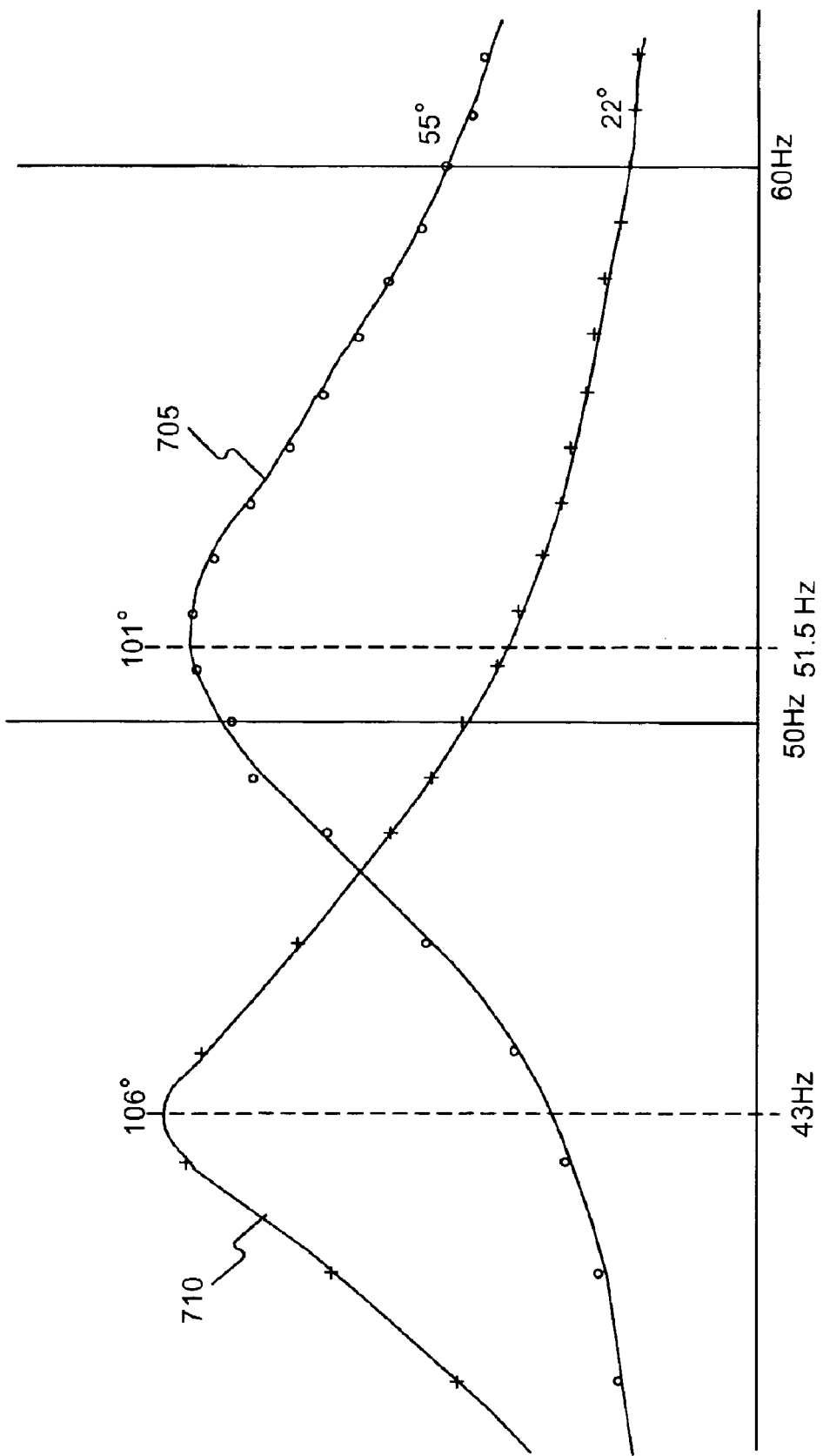
FIG. 7 is a graph illustrating, for a conventional motor, the angle of axial oscillation as a function of the frequency of the current in the motor's coils.
Figure 8:
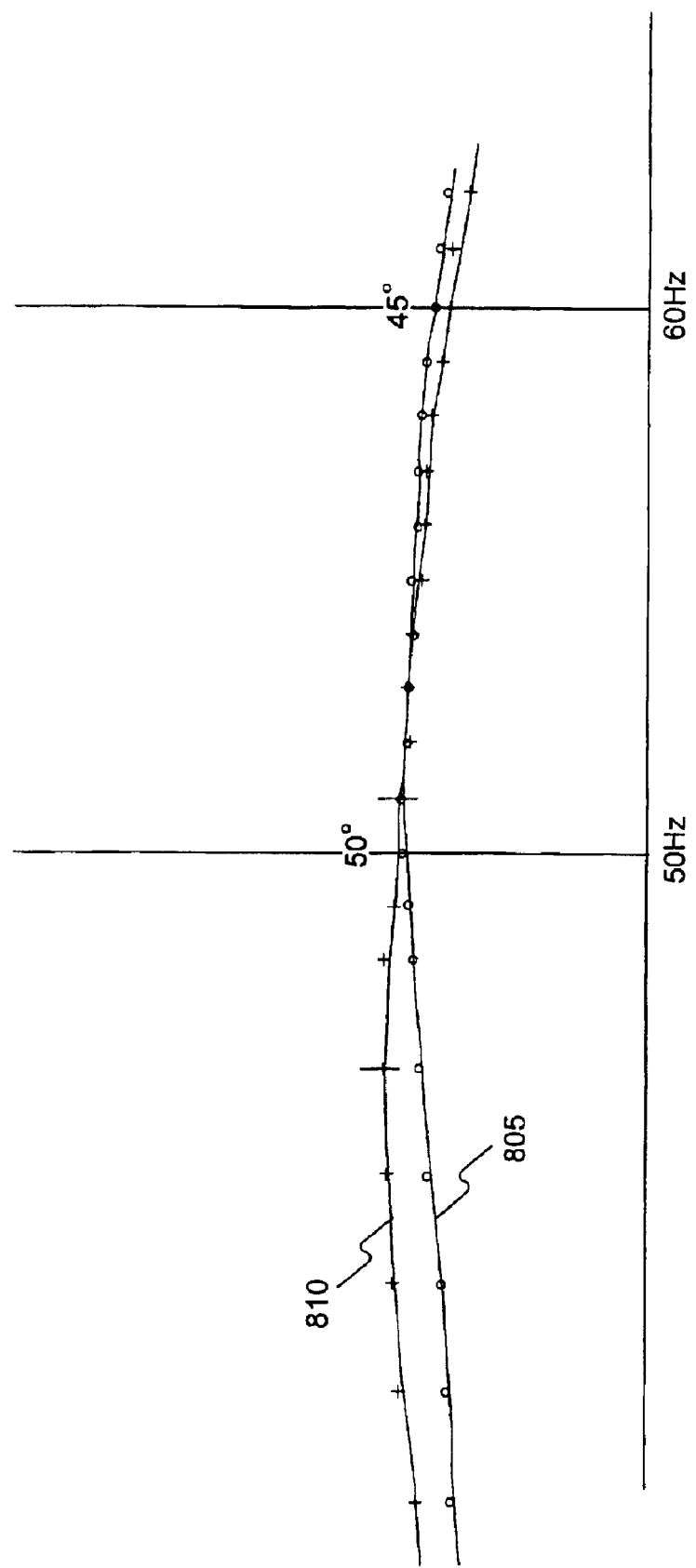
FIG. 8 is a graph illustrating, for an AC motor consistent with an exemplary embodiment of the present invention, the angle of axial oscillation as a function of the frequency of the current in the motor's coils.

To illustrate the aforementioned aspects of embodiments of the present invention, FIGS. 7 and 8 show the angle of axial oscillation as a function of the frequency of the current in the motor's coils for a conventional motor and for one consistent with embodiments of the present invention, respectively. Curve 705 of FIG. 7 shows a conventional motor, with no applied load, having an angle of axial oscillation of approximately 101° at the natural frequency of approximately 51.5 Hz and an angle of axial oscillation of approximately 55° at 60 Hz. Curve 710 of FIG. 7 shows the natural resonance frequency of a conventional motor under an applied load, such as when a normal massaging instrument is fixed to the motor's shaft. For curve 710, the resonance frequency shifts back to approximately 43 Hz and the angle at 60 Hz drops to 22°. Loading the motor further, for example, by pressing the massaging instrument against a body, may further decrease the angle of axial oscillation to unacceptable levels.

FIG. 8 shows the angle of axial oscillation as a function of the frequency of the current for a motor consistent with embodiments of the present invention, while having substantially the same overall physical dimensions of the conventional motor of FIG. 7. Curve 805 shows a motor consistent with an embodiment of the present invention with no instrument on the shaft (no applied load), while curve 810 shows the same configuration with an instrument attached to the shaft (under an applied load). FIG. 8, shows that the two curves are essentially flat and that the angles at 60 Hz are essentially the same with or without an instrument. Furthermore, the angles do not substantially decrease when a normal external load is applied to the instrument. In addition, FIG. 8 illustrates that the rotor essentially has no natural resonance frequency. More specifically, the amplitude or angle of oscillation versus frequency of the energizing coils is substantially flat, having, for example, a maximum 10% variation over a frequency range of 40 Hz. loaded or unloaded with different instruments.

As there is essentially no natural resonance frequency with embodiments of the present invention, any type of instrument (different in shape, size, weight, and/or rotational inertia) can be used with optimum efficiency. Preferably, the instrument should not have a too much rotational inertia because, by the principle "action/reaction," the handle of the device may tend to oscillate. However, this handle oscillation tendency may be dampened by increasing the stator's rotational inertia by adding a heavy external skirt or tube made of, for example, rhenium, iridium, or tungsten, with a density of 20 or more. The aforementioned mentioned materials are exemplary and other material may be used.

Furthermore, conventional motors cannot be constructed to operate optimally on different input power frequencies (for example, 50 Hz in Europe and 60 Hz in the United States.) As illustrated by FIG. 8, motors consistent with embodiments of the present invention are not substantially sensitive to the frequency of the current in the energizing coils and may function well on both 50 Hz and 60 Hz, for example.

Embodiments of the present invention my use a recall spring to match a specific use, for example, for changing the oscillating angle. Moreover, in conjunction with embodiment of the present invention, it is also possible to use a very strong recall spring with a heavy additional mass on the rotor so that a handle attached to the motor will also oscillate and provide a dual motion device. Such a dual motion device can be used to treat sexual disorders where the vibrating casing is used to stimulate the clitoris (blood engorgement) and the vagina, whereas a specific attachment is used at the same time to stimulate the G-spot.

Moreover, embodiments of the present invention may include a multi-level power regulating switch. For example, a switch control knob may be located outside a casing containing motor 100. The control knob may comprise a permanent magnet that controls a plurality of reed switches located inside the casing. The control knob and reed switches, together with a system of resistors, may allow a user to switch the motor "off" or to a plurality of "on" levels. Each of the "on" levels may correspond to a different power level for the motor. For example, the motor may be switched between a low, a medium, or a high power level.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An alternating current motor comprising:
    a rotor configured to rotate about a longitudinal axis, the rotor comprising a diametrically magnetized permanent magnet;
    stationary coils having a magnetic axis substantially perpendicular to the rotor's longitudinal axis, the stationary coils adapted to the rotor's outer periphery and being substantially coaxial with the rotor's longitudinal axis;
    a stator adapted to the stationary coils' outer periphery and being substantially coaxial with the rotor's longitudinal axis; and
    wherein the diametrically magnetized permanent magnet is configured to cause the rotor's oscillation angle to vary substantially less than 30% between the rotor's oscillation angle at a beginning value of a frequency range of an alternating current in the stationary coils and the rotor's oscillation angle at an ending value of the frequency range of the alternating current in the stationary coils.

2. The motor of claim 1, wherein the diametrically magnetized permanent magnet is configured to cause the rotor's oscillation angle to vary substantially less than 20% between the rotor's oscillation angle at the beginning value of the frequency range of the alternating current in the stationary coils and the rotors oscillation angle at the ending value of the frequency range of the alternating current in the stationary coils.

3. The motor of claim 1, wherein the diametrically magnetized permanent magnet is configured to cause the rotor's oscillation angle to vary substantially less than 10% between the rotors oscillation angle at the beginning value of the frequency range of the alternating current in the stationary coils and the rotor's oscillation angle at the ending value of the frequency range of the alternating current in the stationary coils.

4. The motor of claim 1, wherein the frequency range is 40 Hz.

5. The motor of claim 1, wherein the diametrically magnetized permanent magnet is configured to cause the rotor's oscillation angle to vary substantially less than 30% over a frequency range of an alternating current in the stationary coils regardless of a magnitude of a load on the rotor.

6. The motor of claim 1, wherein the diametrically magnetized permanent magnet comprises at least one of a rare earth material, NdFeB, Samarium Cobalt, and Neodymium.

7. The motor of claim 1, wherein the diametrically magnetized permanent magnet comprises one or more segments symmetrical about the longitudinal axis.

8. The motor of claim 7, wherein at least one of the one or more segments comprises two pieces.

9. The motor of claim 8, wherein one of the two pieces comprises a north pole and another the two pieces comprises a south pole.

10. The motor of claim 8, wherein the two pieces are substantial equal by at least one of volume and weight.

11. The motor of claim 1, wherein the stator has a substantially constant permeability for all rotor angular positions about the longitudinal axis.

12. The motor of claim 1, wherein the stator is substantially cylindrical.

13. The motor of claim 1, wherein the stator comprises soft iron.

14. The motor of claim 1, wherein the stator comprises at least two pieces.

15. The motor of claim 1, wherein the alternating current motor is disposed with in one of a small handheld appliance, a beauty care device, a sexual simulation device, a tooth brush, a body massage device, a shoes polisher, a jewelry care device, a hair trimming device, and a hair shaving device.

16. The motor of claim 1, further comprising a recall spring configured to cause the rotor to oscillate at a certain angle.

17. The motor of claim 1, further comprising a control switch configured to control the amount of electrical power delivered to the motor inside a casing, the control switch comprising a permanent magnet located outside the casing configured to control a plurality of reed switches located inside the casing, the reed switches supplying electrical current to a system of resistors.

18. The motor of claim 1, wherein the diametrically magnetized permanent magnet comprises a plurality of diametrically magnetized segments arranged in parallel along the longitudinal axis, wherein each segment is symmetrically oriented about the longitudinal axis, and wherein the number of diametrically magnetized segments included in the motor depends upon a required power output of the motor.

19. An alternating current oscillating motor comprising:
a rotor configured to rotate about a longitudinal axis, the rotor comprising a diametrically magnetized permanent magnet having at least one of a remanence of at feast 10 KG, a coercive force of at least 10 KOe, an intrinsic coercive force of at least 12 KOe, and a maximum energy product of at least 30 MGOe;
stationary coils having a magnetic axis substantially perpendicular to the rotor's longitudinal axis, the stationary coils adapted to the rotor's outer periphery and being substantially coaxial with the rotor's longitudinal axis; and
a stator adapted to the stationary coils' outer periphery and being substantially coaxial with the rotor's longitudinal axis, the stator having a substantially constant permeability for all rotor angular positions about the longitudinal axis wherein the diametrically magnetized permanent magnet comprises a plurality of diametrically magnetized segments arranged in parallel along the longitudinal axis, wherein each segment is symmetrically oriented about the longitudinal axis, and wherein the number of diametrically magnetized segments included in the motor depends upon a required power output of the motor.

20. The motor of claim 19, wherein the diametrically magnetized permanent magnet comprises at least one of a rare earth material, NdFeB, Samarium Cobalt, and Neodymium.

21. The motor of claim 19, wherein the diametrically magnetized permanent magnet comprises one or more segments symmetrical about the longitudinal axis.

22. The motor of claim 21, wherein at least one of the one or more segments comprises two pieces.

23. The motor of claim 22, wherein one of the two pieces comprises a north pole and another the two pieces comprises a south pole.

24. The motor of claim 22, wherein the two pieces are substantial equal by at least one of volume and weight.

25. The motor of claim 19, wherein the stator is substantially cylindrical.

26. The motor of claim 19, wherein the stator comprises soft iron.

27. The motor of claim 19, wherein the stator comprises at least two pieces.

28. The motor of claim 19, wherein the alternating current oscillating motor is disposed with in one of a small handheld appliance, a beauty care device, a sexual simulation device, a tooth brush, a body massage device, a shoes polisher, a jewelry care device, a hair trimming device, and a hair shaving device.

29. The motor of claim 19, further comprising a recall spring configured to cause the rotor to oscillate at a certain angle.

30. An alternating current oscillating motor comprising:
a rotor configured to rotate about a longitudinal axis, the rotor comprising a diametrically magnetized permanent magnet having at least one of a remanence of at least 10 KG, a coercive force of at least 10 KOe, an intrinsic coercive force of at least 12 KOe, and a maximum energy product of at least 30 MGOe;
stationary coils having a magnetic axis substantially perpendicular to the rotor's longitudinal axis, the stationary coils adapted to the rotor's outer periphery and being substantially coaxial with the rotor's longitudinal axis;
a stator adapted to the stationary coils' outer periphery and being substantially coaxial with the rotor's longitudinal axis, the stator having a substantially constant permeability for all rotor angular positions about the longitudinal axis; and
a control switch configured to control the amount of electrical power delivered to the motor inside a casing, the control switch comprising a permanent magnet located outside the casing configured to control a plurality of reed switches located inside the casing, the reed switches supplying electrical current to a system of resistors.

* * * * *